July 19, 1966 S. V. HOLGERSSON 3,261,543

SUSPENSION AND VIBRATION-DAMPING DEVICE FOR FANS

Filed June 1, 1964

STEN V. HOLGERSSON
INVENTOR
BY
BUCKHORN, BLORE, KLARQUIST & SPARKMAN
ATTORNEYS 3,261,543
SUSPENSION AND VIBRATION-DAMPING
DEVICE FOR FANS
Sten Valdemar Holgersson, Enkoping, Sweden, assignor to
Aktiebolaget Bahco, Stockholm, Sweden, a corporation
of Sweden
Filed June 1, 1964, Ser. No. 371,373
2 Claims. (Cl. 230—235)

The present invention relates to a suspension and vibration-damping device for fans and comprises a fan housing and a supporting frame suitably integral with said housing, an electric motor for the fan wheel being connected to said frame by means of two or more, preferably three radial supporting arms the radially outermost ends of which are connected to the frame by means of a rubber spring in the shape of a pad intended to take up the vibrations in a plane perpendicular to rotational axis of the motor due to variations of the torque of the motor.

The object of the present invention is to reduce the vibrations caused by the driving motor and thus the noise in the fan housing which noise is very disturbing in prior art suspension means, especially in kitchen and ventilation fans for apartment houses. These vibrations and this disturbing noise are especially annoying with the commonly used single phase motors for such fans due to the variation of the torque in such motors.

This is according to the present invention achieved in that the innermost ends of the supporting arms are pivotally connected to the motor or a member rigidly connected thereto.

The invention will be further described in the following in connection with the embodiment shown on the attached drawing.

Figure 1:
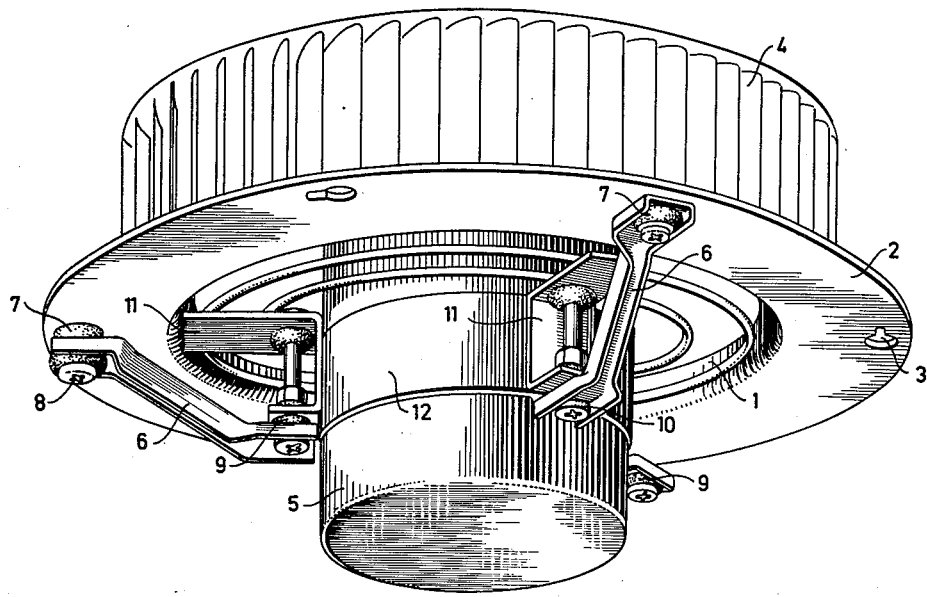
FIG. 1 shows a fan according to the invention in perspective view.
Figure 2:
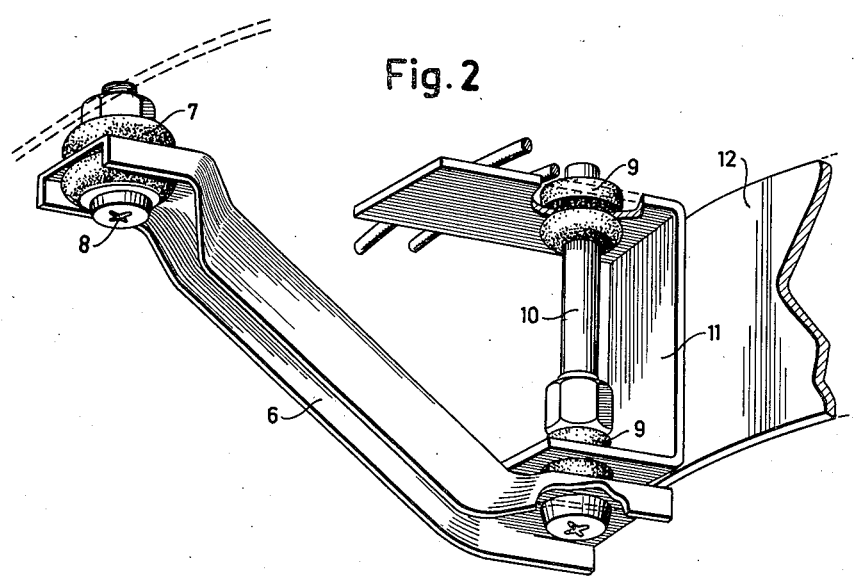
FIG. 2 shows a part of the mounting device in perspective view and on a larger scale.

On the drawing 1 designates the fan housing integral with a supporting frame 2 provided with holes 3 for connecting the frame e.g. in the ceiling of a room or other space. The electric motor 5 for driving the fan wheel 4 is supported by a number of arms 6 (preferably three) which are equally spaced around the circumference. The outer end of each arm is connected to the supporting frame 2 by means of a rubber spring 7 acting as a vibration damping means and connected to the supporting arm by means of a bolt 8. The inner end of each arm 6 is also by means of rubber springs 9 and a bolt 10 connected to a U-shaped bracket 11 in the outwardly directed radial arms of which said last-mentioned rubber springs are connected. The bracket 11 is e.g. by welding connected to a strap 12 surrounding the motor. By making the rubber springs 7 at the outer ends of the supporting arms in the way shown on the drawing i.e. in the shape of rubber pads which can be given any desired pre-tension by a more or less strong tightening of the associated connecting bolt 8, it is achieved that the resilience which shall be used for damping the movements occurring in a plane perpendicular to the rotational axis of the motor due to the variation of the torque of the motor, is relatively great while on account of the greater rigidity of the spring in the other direction i.e. parallel to the rotational axis where the noise amplitudes are smaller the damping movements become relatively small. The vibrations occurring in said last-mentioned direction are to a considerable extent taken up already by the rubber springs 9 at the inner ends of the arms 6 as it is desirable to prevent as far as possible these vibrations from being transferred to the supporting arms 6. In the specific example shown in the drawings the radially extending arms 6 are connected by rubber springs to the frame 2 to provide for limited pivotal movement of the arms about an axis parallel to the rotational axis of the motor in order to provide the resilient damping referred to above. Movements occurring in a plane perpendicular to the rotational axis of the motor due to variation of the torque of the motor are thus damped. Also the inner ends of the arms 6 are shown as being connected to the motor for limited pivotal movement of the arms relative to such brackets about an axis parallel to the rotational axis of the motor and rubber springs can also be employed for this connection to also provide resilient damping of such movements.

It has been found that the now shown and described suspension and vibration-damping device meets the requirements in a very satisfactory way. Although the invention as already has been mentioned in the preamble is especially intended in connection with such fans which are driven by single phase motors it can of course with advantage also be used for two and three phase motors. Furthermore the invention is not limited to the now shown and described embodiment but the same may be varied in many ways within the scope of the following claims.

I claim:
1. A suspension and vibration damping device for a motor driven fan including a fan wheel, a motor for supporting and driving said fan wheel and a supporting frame surrounding said motor, said damping device comprising:
   a plurality of circumferentially spaced supporting arms each extending radially of said motor between said motor and said frame, and
   means for resiliently damping vibrational movements occurring in a plane perpendicular to said rotational axis due to variation of the torque of said motor including,
   pivotal connection means connecting the outer ends of each of said arms to said frame for limited pivotal movement relative to said frame about an axis parallel to the rotational axis of said motor,
   and pivotal connection means connecting the inner ends of each of said arms to said motor for limited pivotal movement relative to said motor about an axis parallel to said rotational axis, the pivotal connection means for at least one end of each of said arms being a rubber spring means.
2. A suspension and vibration damping device in accordance with claim 1 in which the pivotal connection means at the other ends of each of said arms is also a rubber spring means.

References Cited by the Examiner
UNITED STATES PATENTS

| | | | |
|---|---|---|---|
| 1,781,155 | 11/1930 | Anderson | 230—117 |
| 2,228,116 | 1/1941 | Ilg et al. | 230—117 X |
| 2,448,671 | 9/1948 | Hord | 98—117 |
| 2,800,272 | 7/1957 | McKee | 230—117 |

ROBERT M. WALKER, *Primary Examiner.*